United States Patent [19]

Sannipoli et al.

[11] 4,369,869

[45] Jan. 25, 1983

[54] SAFETY DEVICE FOR MECHANICAL OR HYDRAULIC PRESSES

[75] Inventors: Anna M. Sannipoli, Gubbio; Lordana Nibi, Fabriano; Giorgio Saldi, Gubbio, all of Italy

[73] Assignee: Sicurpress Antinfortunistica & C., Gubbio, Italy

[21] Appl. No.: 188,105

[22] Filed: Sep. 17, 1980

[30] Foreign Application Priority Data

Oct. 17, 1979 [IT] Italy .................................. 631 A/79

[51] Int. Cl.$^3$ ........................ F16P 3/18; F16D 67/02; F16F 9/34

[52] U.S. Cl. ................................ 192/131 R; 188/299; 188/319; 192/12 R

[58] Field of Search ............... 192/131 R, 12 R, 12 C, 192/12 D; 188/299, 319; 267/119, 130

[56] References Cited

U.S. PATENT DOCUMENTS

| | | | |
|---|---|---|---|
| 2,064,832 | 12/1936 | Hollander | 188/319 X |
| 2,148,891 | 2/1939 | Applegarth | 188/319 |
| 2,507,276 | 5/1950 | Skwaryk | 188/299 |
| 3,578,123 | 5/1971 | Freeland | 100/53 X |
| 4,026,204 | 5/1977 | Good | 192/131 R X |

*Primary Examiner*—Allan D. Herrmann

*Attorney, Agent, or Firm*—Blair, Brown & Kreten

[57] ABSTRACT

A cylindrical chamber full of oil, without any valves or inlet/exit ports for this oil. A piston travels in said sealed cylindrical chamber with a rod on either side, assembled with sealing rings and provided with a series of peripheral axial holes all of the same diameter and equidistant from the piston axis. On the rod anchored to the ram slides a plunger disc supported directly under the piston assembly by two diametrically opposed threaded studs with large heads. Said studs are first threaded through the piston assembly and then screwed through the two holes found on the plunger disc. The upward travel of this disc which stops under and against the piston holes, is prevented each time the dual push-button control is operated since, when operating, these buttons, besides starting the movement of the ram, prevents the upward travel of the plunger disc simultaneously. Included is a slider which, via a pneumatic cylinder installed at the top of the upper piston rod, is lowered and pressed on to the large heads of the two aforementioned studs thereby preventing their upward movement. Should the ram descend accidentally this mechanism does not operate; thus the plunger disc may rise and close off the holes on the piston. Consequently the incompressible oil enclosed and compressed in the lower cylinder chamber provides for the instant arrest of the piston assembly movement and therefore also that of the ram anchored to the rod.

6 Claims, 7 Drawing Figures

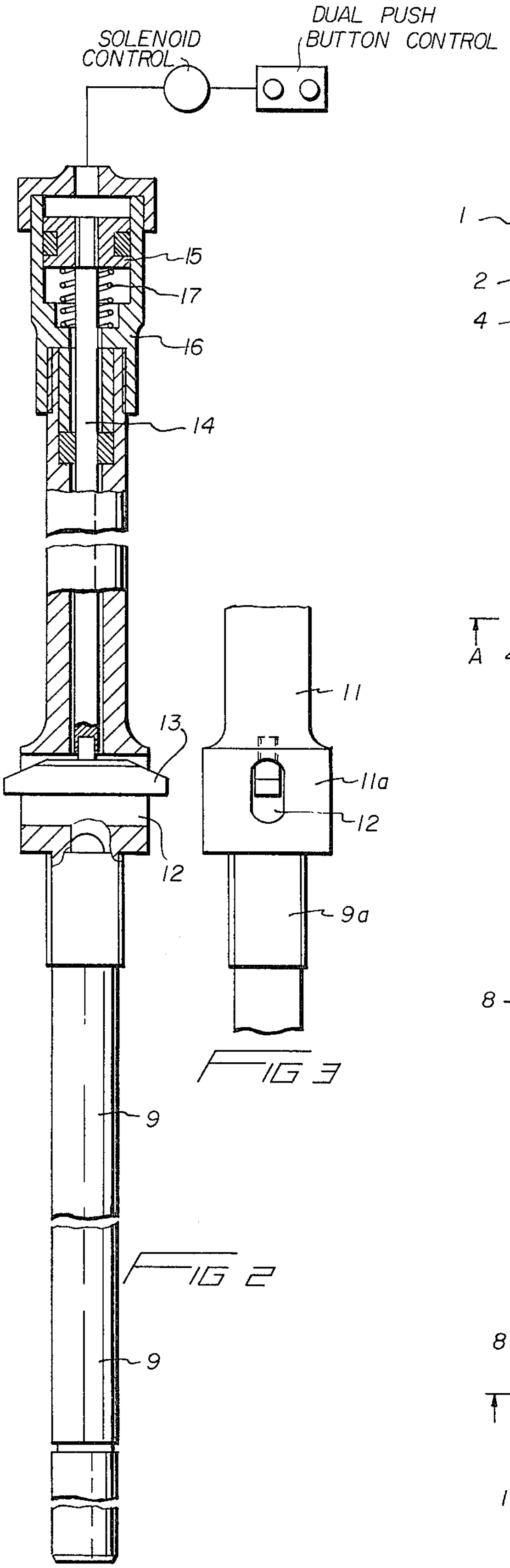
FIG 3
FIG 2
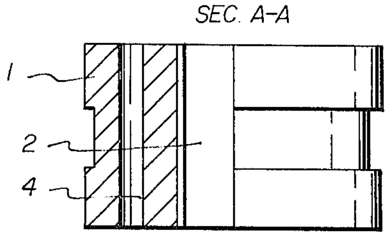
FIG 5
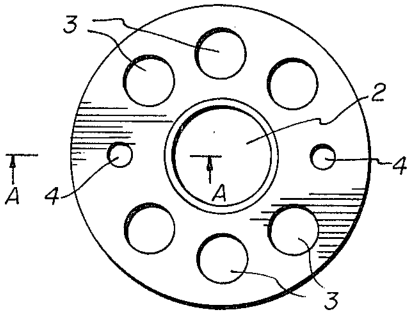
FIG 4
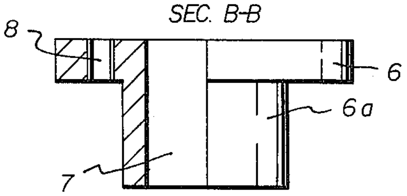
FIG 7
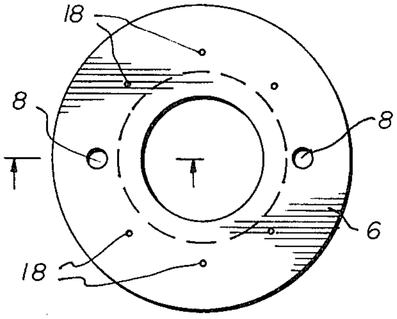
FIG 6

SAFETY DEVICE FOR MECHANICAL OR HYDRAULIC PRESSES

BACKGROUND OF THE INVENTION

The present invention relates to a safety device for mechanical or hydraulic presses whereby the travel of the ram is interrupted in the shortest possible time and movement whenever the ram begins an uncontrolled or unexpected downward stroke without any manual or automatic instruction for this.

OBJECTS AND SUMMARY OF THE INVENTION

The object of this invention is to provide a safety device of a simple structural and functional character, which is also compact and easily installed and manufactured from common commercial materials thereby not requiring any particular technical or mechanical work.

The safety device in accordance with the instant invention basically consists of a vertical shaft which is rigidly fixed to the ram and follows all its movements.

Said shaft, in effect, is the rod of a special piston fitted with sealing rings, which slides inside a sealed cylindrical chamber full of oil in which there are no valves or inlet/exit ports for said oil.

This piston moves inside the sealed cylinder thanks to a series of peripheral axial holes found therein, which, in the case of an accidental downward stroke of the ram, are automatically and immediately obstructed by a plunger disc fitted on the rod and located directly under the piston assembly.

In this event the incompressible oil enclosed in the lower chamber of the cylinder instantaneously stops the travel of the piston assembly and with it that of the ram anchored to the rod.

These and other objects, features and advantages of the instant invention will become more apparent from the following detailed description of the invention when taken in conjunction with the accompanying drawings which show one embodiment of the instant invention, and wherein:

DESCRIPTION OF THE DRAWING FIGURES

FIG. 2 is the rod shown on its own with the upper rod almost completely in section;

FIG. 3 is a left view of the central section of the rod illustrated in FIG. 2;

FIG. 4 is a top view of the piston;

FIG. 5 is a sectional view of the piston with the plane A—A of FIG. 5;

FIG. 6 is a top view of the plunger disc;

FIG. 7 is a sectional view of the plunger disc with the plane B—B of FIG. 6.

DESCRIPTION OF THE PREFERRED EMBODIMENT

Figure 1:
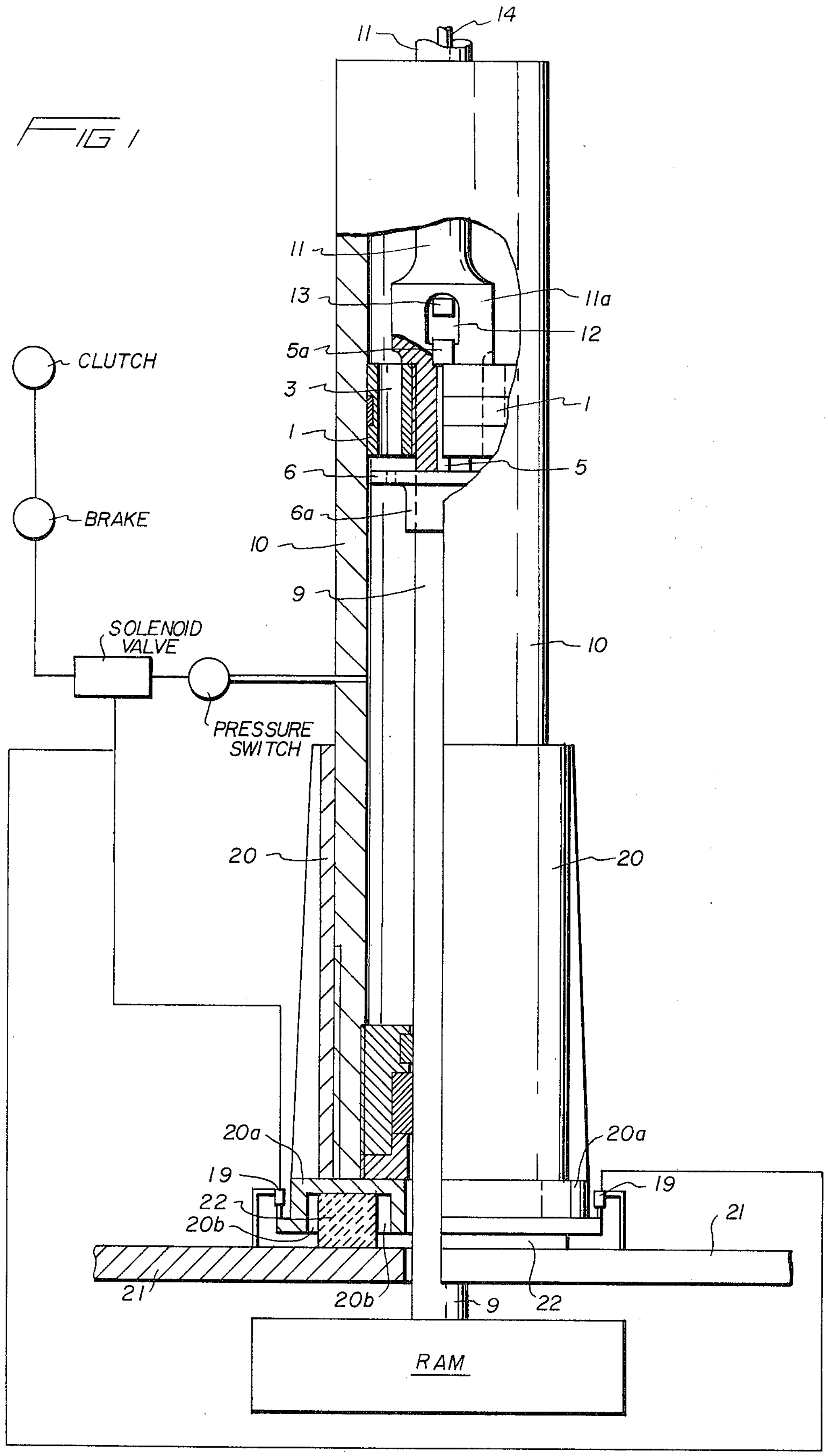
FIG. 1 illustrates half in view, half in section, the sealed cylinder and mounting.

Referring now to the drawings, the piston consists of a cylindrical body member (1) with a central threaded hole (2) and a series of peripheral axial holes (3) all of the same diameter and equidistant from the axis of the body (1).

The piston also has two small axial holes (4), diametrically opposed, into which the two studs (5) with enlarged heads **(5*a*)** and threaded ends are guided and slide.

These two studs provide the support for the plunger disc (6) having a guide sleeve **(6*a*) and a central hole (7); said disc also has two small threaded holes (8) diametrically opposed into which screw the ends of the aforementioned studs (5)**.

The piston and plunger disc coupled together by the studs (5), as apparent from FIG. 1, are both fitted on to the rod (9) with a threaded middle section **(9*a*)** where the piston assembled with sealing rings is screwed on to its location.

The rod (9) with piston and plunger disc is fitted into the sealed cylinder (10) which is mounted to a fixed and rigid part of the press together with the insertion of the shock-absorbing parts, as will be described in detail further on.

A closer examination of the structural configuration of the rod and upper rod shows, in effect, a single shaft which passes through the piston and both ends of the cylinder (10).

The upper rod (11) has an enlarged diameter **(11*a*) immediately above the piston corresponding to which there is a transverse slot (12) from which protrudes on either side a slider block (13), fitted and guided inside said transverse slot (12)**.

The slider (13) is fixed to the base of a thin rod (14) which fits and slides in the axial aperture that runs the whole length of the upper rod (11), and locates at the bottom in the centre of the aforementioned slot (12).

The upper end of the rod (14) is screwed to the small piston (15) of a small pneumatic cylinder (16) threaded to the upper rod (11).

The return spring (17) under the small piston (16) permanently presses the latter upwards and thus in turn pulls the slider (13) against the top of the slot (12) unless air in the small cylinder (16) is used to compress the return spring.

At this juncture the mode of action of the herein described and illustrated safety device can be examined.

Supposing, for example, during a single-stroke operation, which has the highest accident rate, a repetition of the stroke occurs.

As any expert in this field knows, with a single-stroke operation it is necessary to operate and hold depressed the dual push-button control to make the ram descend and to hold these buttons depressed at least until the ram has come to rest at Bottom Dead Centre (B.D.C.). Following this, whether the control buttons are held depressed or released the ram continues its return stroke and always comes to a halt at its Top Dead Centre (T.D.C.) thanks to an end-of-stroke switch.

The operator confident in the normal action of the press does not wait for the ram to come to rest at T.D.C. but manages to accomplish the appropriate operation during the upstroke, hence subjecting himself to an inevitable accident should the ram accidentally repeat its stroke.

It may be affirmed now that the safety device in accordance with the instant invention provides that each time the press's dual push-button control is used besides putting into operation the solenoid valve for the clutch-brake action, a second solenoid valve is contemporaneously excited which operates the small pneumatic cylinder (16) whereby the small piston (15) descends overcoming the resistance of the spring (17). Thus the rod (14) and slider (13) remain lowered as long as the said push buttons are held depressed, which, in the case of a single-stroke operation, is for the whole descent of the ram.

During this phase, the piston assembly slides downwards in the oil inside the cylinder (10) as the plunger disc (6) which would tend to rise, cannot travel upwards to rest under and against the piston assembly since said disc is held down by the slider which protrudes from the slot (12) and presses on the heads **(5*a*) of the studs (5)**.

When the ram passes B.D.C. and on release of the dual push-button control the solenoid valve of the small pneumatic cylinder is deactivated so that during the ram's return stroke the spring (17) pulls up the rod (14) and slider (13), the return action of which is no longer necessary in that the oil tends to brake the disc keeping it away from the passage holes (3) of the piston assembly.

It is important structurewise that the total area of the passage holes (3) be the same as the annular area found between the plunger disc (6) and the internal wall of the cylinder (10).

In the accidental case when the ram instead of stopping at T.D.C. starts an unexpected downward stroke, inside the cylinder (10) where the piston assembly is drawn downwards, the plunger disc (6) no longer resisted by the now raised slider (13) travels upwards along the rod (9) until it rests against and under the piston, with the immediate closure of the holes (3) and the instant arrest of the piston movement and consequently the ram which is fixed to the rod (9).

To ensure that the arrest action is not too sudden and does not overstrain the materials, given the amount of inertial mass in play, a series of very small holes (18) are provided in the plunger disc (6), coaxial with the holes (3) provided in the body (1) of the piston.

With the intervention of the present safety device and the sudden arrest of the ram stroke a tiny quantity of oil may pass upwards from the lower to the upper chamber of the cylinder via said holes (18) so as to obtain a first shock-absorbing effect from which there follows a second, as will be explained further on.

The said form of intervention of the instant safety device is but one example to illustrate its use in the case of a single-stroke operation, the same action would result with inching-stroke or continuous, whenever the ram starts an uncontrolled downward stroke without the dual push-button control having been pressed, this meaning that the mechanism which stops the upward movement of the plunger disc (6) has not been put into action.

Even though the safety device hereto described and illustrated may be considered perfectly complete and functional, there is, however, a further improvement on the present inventive concept.

In fact, to avoid an unavoidable build-up of very high pressure inside the cylinder (10) during the arrest of the ram, in conjunction with the lower cylinder chamber a pressure switch (illustrated only schematically in the attached drawings as its application to the device is carried out in accordance with standard technical procedure) is provided so that as soon as the pressure exceeds the fixed value it immediately activates the press's solenoid valve which in turn operates the brake and contemporaneously releases the clutch.

Thanks to the immediate intervention of this pressure switch the arrest of the ram stroke is not only dependent on the pull action of the rod (9) in as much as the ram itself undergoes a direct breaking action on the application of the brake and the release of the press clutch even before the oil pressure inside the lower cylinder chamber (10) reaches high and undesirable levels.

For further safety the instant invention also provides two independent micro-switches (19) for the activation of the aforementioned solenoid valve, arranged on the fixed support holding the cylinder (10).

Referring now to FIG. 1, said cylinder (10) in accordance with the instant invention is fitted and screwed inside a cylindrical support cup (20) which has a longitudinal outside rib for strength and a thick circular base **(20*a*) with an outside flange and annular seat (20*b*)** machined under the base.

The fixing of the support cup (20) to the rigid location (21) is by means of several periferal bolts corresponding to the flange, with a spring washer (22) inserted inside said circular seat **(20*b*) underneath the base (20*a*)**.

Both the micro-switches (19) are fixed to the rigid plane (21) and are arranged in such a way that when contact is lost with the outside flange of the cup **(2*o*)**, obviously following a lowering of said flange, they operate simultaneously but independently on the press's solenoid valve for the operation of the brake and the release of the clutch.

Operating on the peripheral fixing bolts it is possible to preload the spring washer (22) to a value which, however, must be superior to the minimum value under which the washer (22) undergoes compression and elastic movement even during the normal operation of the press.

It is obvious that varying the preload to over the minimum it is possible to predetermine the extent of the accidental load able to compress the spring washer further and consequently untrip the micro-switches (19) with the activation of the solenoid valve for the operation of the clutch-brake. It is apparent from FIG. 1 that the width of the annular seat **(20*b*) underneath the base (20) is greater than the width of the spring washer (22)** so that the latter may expand should there be loads superior to the preload at the moment of the ram's arrest.

The shocking-absorbing action of the spring washer (22) follows and assists the preceding action which results from the small quantity of oil trickling through the tiny holes (18) of the plunger disc (6).

I claim:

1. A safety device for a ram for preventing unwanted travel of the ram in a press or the like which includes:

the ram, a rod (9) operatively connected thereto and a dual hand control requiring two hands to energize and displace the ram and the rod;

the improvement comprising:

a piston fixed to the rod intermediately thereby defining upper (11) and lower (9) rod portions, the ram connected to the lower rod portion, a cylinder within which said piston is moveable, fluid in said cylinder, passage holes in said piston to allow migration of fluid when said piston moves with the rod, a plunger disc (6) slidably supported on said lower rod having studs (5) extending through and depending from said piston by enlarged heads **(5*a*)** on a top portion of said studs resting on a top piston face, said plunger disc having a bearing surface adapted to occlude said piston passage holes and means to keep said bearing surface of said plunger disc away from said piston and operated by and when the dual hand control is activated to allow fluid to pass through said piston and therefore said piston to move.

2. The device of claim 1 wherein said piston passage holes have a cross section equal to clearance between said plunger disc and said cylinder.

3. The device of claim 2 wherein said plunger disc includes a plurality of small holes held in alignment with said piston passage holes whereby abrupt fluid pressure buildup caused by occluding said piston passage holes is partially dissipated through said small holes.

4. The device of claim 3 wherein said means to keep said plunger disc bearing surface from said piston comprises:

an axial hollow within said upper rod, a further rod (14) axially movable within said hollow having a slider (13) at a lower end thereof constrained in an upper rod slot, an upper further rod end formed as a small piston (15), biasing means for urging said further rod upwardly, and fluid means responsive to the dual hand control for urging said small piston (15) downwardly against said biasing means whereby said slider abuts against said stud enlarged heads (5*a*).

5. The device of claim 2 or 4 wherein said cylinder includes a pressure responsive bleed and switch below said piston to relieve abrupt pressure buildup, the switch operatively connected to a ram brake.

6. The device of claim 2 or 4 wherein said cylinder is supported by a support cup having a reinforced base housing adapted to reside on a surface;

a seat in said base housing including a spring washer adapted to be adjustably tensioned so as to react against associated ram pressure;

and mico switch sensing means extending between said housing and the surface and operatively connected to the ram brake to activate the ram brake responsive to exceeding the pressure setting of said spring washer.

* * * * *